US011363093B2

(12) United States Patent
Lee et al.

(10) Patent No.: US 11,363,093 B2
(45) Date of Patent: Jun. 14, 2022

(54) MULTI-STAGE PIPELINING FOR DISTRIBUTED GRAPH PROCESSING

(71) Applicant: Oracle International Corporation, Redwood Shores, CA (US)

(72) Inventors: Jinsu Lee, San Mateo, CA (US); Thomas Manhardt, Foster City, CA (US); Sungpack Hong, Palo Alto, CA (US); Petr Koupy, Blansko (CZ); Hassan Chafi, San Mateo, CA (US); Vasileios Trigonakis, Zurich (CH)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 342 days.

(21) Appl. No.: 15/968,637

(22) Filed: May 1, 2018

(65) Prior Publication Data

US 2019/0342372 A1    Nov. 7, 2019

(51) Int. Cl.
*H04L 29/08* (2006.01)
*G06F 16/901* (2019.01)
*H04L 67/10* (2022.01)

(52) U.S. Cl.
CPC .......... *H04L 67/10* (2013.01); *G06F 16/9024* (2019.01)

(58) Field of Classification Search
CPC .............................. H04L 67/10; G06F 16/9024
See application file for complete search history.

(56) References Cited

U.S. PATENT DOCUMENTS

| 9,535,756 | B2 | 1/2017 | Depner et al. |
| 9,740,536 | B2 | 8/2017 | Van Der Lugt et al. |
| 2010/0205611 | A1* | 8/2010 | Wagner ................... G06F 9/546 |
| | | | 719/313 |
| 2012/0290694 | A9* | 11/2012 | Marl ................... H04L 12/2807 |
| | | | 709/223 |
| 2017/0075721 | A1* | 3/2017 | Bishop ................. G06F 9/4881 |
| 2017/0169133 | A1* | 6/2017 | Kim .................... G06F 16/9024 |
| 2018/0039710 | A1* | 2/2018 | Chen ................... G06F 16/9024 |
| 2018/0248820 | A1* | 8/2018 | Milyakov ............... H04L 51/14 |
| 2019/0065246 | A1* | 2/2019 | Senapaty ................ G06F 9/542 |
| 2019/0334778 | A1* | 10/2019 | Parthasarathy ..... G06F 9/45558 |
| 2019/0342372 | A1* | 11/2019 | Lee ......................... H04L 67/10 |

* cited by examiner

*Primary Examiner* — Charles E Anya
(74) *Attorney, Agent, or Firm* — Hickman Becker Bingham Ledesma LLP

(57) ABSTRACT

Techniques are described herein for evaluating graph processing tasks using a multi-stage pipelining communication mechanism. In a multi-node system comprising a plurality of nodes, each node of said plurality of nodes executes a respective communication agent object. The respective communication agent object comprises: a sender lambda function is configured to perform sending operations and generate source messages based on the sender operations. An intermediate lambda function is configured to read source messages marked for a node, perform intermediate operations based on the source messages and generate intermediate messages based on the intermediate operations. A final receiver lambda function configured to: read intermediate messages marked for said each node, perform final operations based on the intermediate messages and generate a final result based on the final operations.

16 Claims, 7 Drawing Sheets

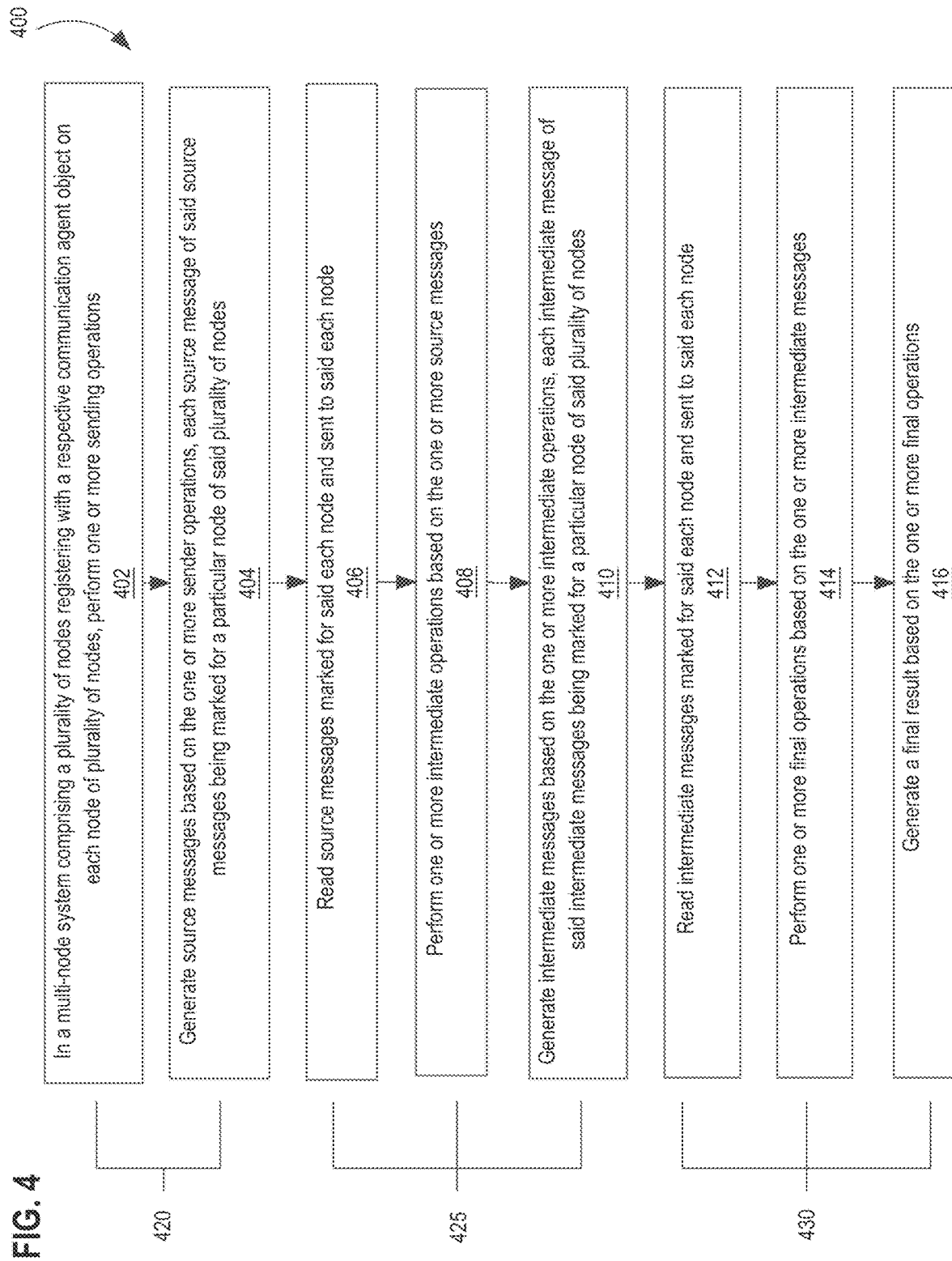

FIG. 5

```
void salary_sum(list<person_key_t> input) { pipe = new communicationPipeline()

.setSender([&](data_agent* agent) {
        for( p_key : input) {
            int dest = HASH(p_key)% NUM_MACHINES;
            agent->beginMessage(dest);
            agent->addMessageData(p_key, sizeof(person_key_t));
            agent->endMessage(); } })

.addPipe([](data_agent* agent) {
        person_key_t p_key = agent->getMessageData(sizeof(person_key_t));
        int s_val = Salary[p_key];
        person_key_t sp_val = Spouse[person];
        int dest = HASH(sp_val)% NUM_MACHINES;
        agent->beginMessage(dest);
        agent->addMessageData(p_key, sizeof(person_key_t));
        agent->addMessageData(sp_key, sizeof(person_key_t));
        agent->addMessageData(s_val, sizeof(int));
        agent->endMessage(); })

.setReceiver([&](data_agent* agent) {
        person_key_t p_key = agent->getMessageData(sizeof(person_key_t));
        person_key_t sp_key = agent-> getMessageData(sizeof(person_key_t));
        int s_val = agent->getMessageData(sizeof(int));
        int s_val2 = Salary[sp_key];
        int sum = s_val + s_val2;
        Output.add(p_key, sp_key, sum); })

.begin(); }
```

MULTI-STAGE PIPELINING FOR DISTRIBUTED GRAPH PROCESSING

FIELD OF THE INVENTION

The present invention relates to graph processing and analytics.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graph analysis is an important type of data analytics where the underlying data-set is modeled as a graph. Since such a graph representation captures relationships between data entities, applying graph analysis procedures can provide valuable insight about the original data-set. Examples of popular graph analysis procedures are Community Detection, PageRank, Finding Shortest Paths, and Link Prediction. By analyzing graphs, the user can get deeper insights about the dataset that the graph represents.

There are several different approaches in performing graph analysis. A first approach includes running graph algorithms that perform whole graph traversal and applying custom computations. A second approach includes running graph queries. A third approach includes exploring graphs interactively.

Most existing distributed graph processing frameworks focus on the above mentioned first approach and therefore adopt the bulk-synchronous execution model. Examples of bulk-synchronous execution frameworks include Giraph on Map-Reduce (Hadoop), GraphFrame (Spark). In these frameworks, the algorithm is decomposed into a series of bulk-synchronous steps where every machine participates in computation at every step, while global synchronization is required between steps.

For workloads associated with the previously mentioned first and second approaches to performing graph analysis, the bulk-synchronous execution framework works relatively well as it maximizes parallel computation and allows batched (delayed) communication.

However, there are workloads whose characteristics do not adapt well to bulk-synchronous execution. Specifically, there are cases where the amount of computation and communication required for each operation is very small and the latency of the operation is important. For instance, when a user is interactively exploring a graph, the user wants to quickly list and visualize all the vertices within 2-hop of a specific vertex. A bulk-synchronous execution engine is a bad choice for implementing such operations, since it yields significant latency.

Discussed herein are approaches for achieving increased computational efficiency and lower latency for graph processing operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 shows an example procedure for a multi-stage pipelining communication mechanism for distributed graph processing.

FIG. 5 illustrates an example API to setup a data pipeline for distributed graph processing.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for evaluating graph processing tasks using a multi-stage pipelining communication mechanism. As described herein, a multi-stage pipelining communication mechanism can be used to efficiently evaluate certain types of graph processing tasks.

Currently, to analyze and process graphs, most existing distributed graph processing frameworks adopt the bulk-synchronous execution model such as Giraph on Map-Reduce (Hadoop), GraphFrame (Spark). In these frameworks, the algorithm is decomposed into a series of bulk-synchronous steps where every machine participates in computation at every step, while global synchronization is required between steps.

Using the bulk-synchronous execution model, once a local computation is finished for a given vertex of a graph, processing deactivates itself and the host waits for all other vertices to finish. Thus, when a process reaches this point (the barrier), it waits until all other processes have reached the same barrier. The barrier of synchronization mechanism allows the next processing step to begin when processing for all vertices is completed in the current step. Bulk synchronous processing may be very efficient graph computation model for workloads that involve global (i.e. all vertex or all edges) computation and synchronous communication.

For operations such as vertex/edge property access from a vertex/edge key and fixed-depth graph exploration, the amount of computation/communication per each operation is very small and the latency of the operation is important. For these types of workloads, the bulk-synchronous execution model yields significant latency due to imposing synchronization barriers between machines handling the processing.

In an improved technique of using a multi-stage pipelining communication mechanism, a user is provided with an API to provide asynchronous communication between graph processing machines. The user-defined, asynchronous technique enables the low-latency processing of fixed-depth graph exploration tasks and vertex property access from a vertex key.

System Overview

Figure 1:
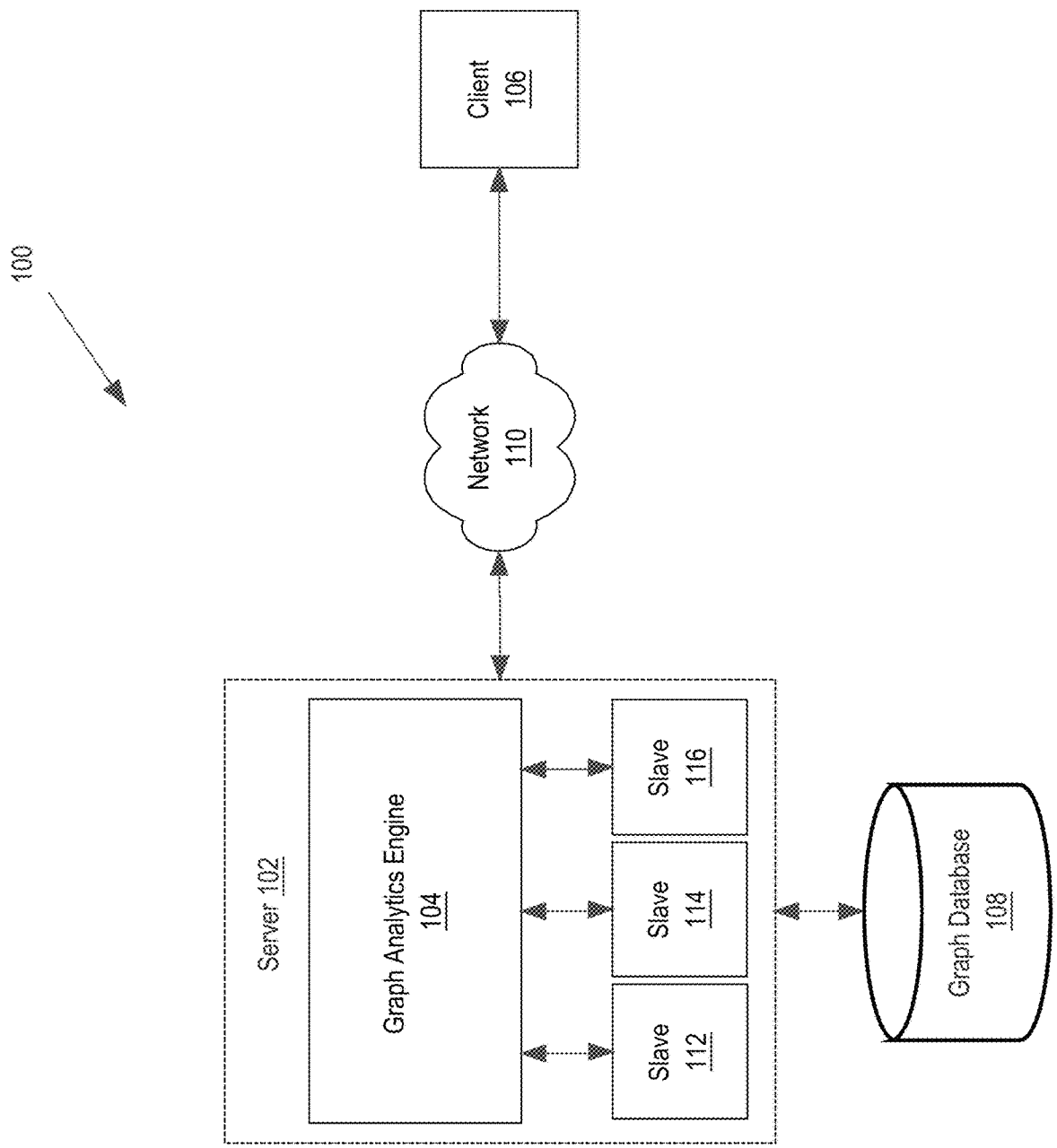
FIG. 1 illustrates an example system for evaluating a graph processing task with a multi-stage pipelining communication mechanism.

FIG. 1 illustrates an example system for evaluating a graph processing task with a multi-stage pipelining communication mechanism. In an embodiment, an example system may include a server 102, graph analytics engine 104, client 106, graph database 108, network 110, and slaves 112, 114, 116.

The graph analytics engine 104 performs one or more graph analytic operations on a graph that is loaded from graph database 108. A graph includes nodes and edges which are stored in graph database 108. The graph analytics engine 104 may be implemented in hardware, software, or any combination of hardware and software. For example, the graph analytics engine 104 may execute on one or more nodes, each comprising one or more processors and memory (such as random access memory (RAM)) that stores software instructions that, when executed, cause the one or more processors to perform graph analytics operations, such operations including generating data in-memory or persistently, including generating results that are returned to client 106 of the graph analytics engine 104. Even though FIG. 1 depicts a single element for a graph analytics engine 104, graph analytics engine 104 may be implemented on a single computing device or on multiple computing devices.

The graph analytics engine 104 functions as a server for client 106. Client 106 connects to the graph analytics engine 104 and requests certain types of tasks, such as loading a graph into memory and performing graph analytic operations, including returning information about a graph, adding nodes and edges to a graph, deleting nodes and edges from a graph, and updating properties or attributes of nodes/edges of a graph. Thus, graph analytics engine 104 translates client requests into graph operations that a storage device that stores graph database 108 recognizes or is configured to process.

Slaves 112, 114, 116 are computer system processes or machines that execute tasks assigned by the graph analytics engine 104. The term process is used herein to refer to a computer system process, as described in the section Software Overview. Slaves 112, 114, 116 may exist outside of server 102 and may be accessible over network 110. Slaves 112, 114, 116 may execute tasks in parallel, communicate with each other in order to synchronize task execution, and complete graph processing operations. Each slave process 112, 114, 116 may be responsible for managing localized data required to compute distributed graph analytics operations. Additionally, each slave may be referred to as a 'machine' or 'node' as discussed herein.

Client requests may conform to a standard or proprietary set of APIs, such as BluePrint API, and may also conform to a custom API, as discussed herein.

A client 106 may connect to the server 102 on a session level basis. A session is a particular connection established for a client 106 to a server 102 through which the client 106 issues a series of requests (e.g., requests for execution of graph processing tasks). The server 102 may maintain session state data about the session. The session state data reflects the current state of the session and may contain the identity of the client 106 for which the session is established, services used by the client, and other information. The current state of the session is all of the session state data associated with a port associated with the database session. Subsequent commands received over the port are assumed by the server 102 to be associated with all of the session state data associated with the port until such session is terminated. When the session is terminated, the session state data is deleted.

When a new session is established on the port, the client 106 determines new session state data to use for the new session and directs the server to load the new session state data for the new session.

Connections are mechanisms for enabling sessions. A connection may refer to either a physical mechanism, such as a physical port, or a logical connection mechanism, or both. Often, there is a one-to-one mapping of logical connections to physical connections; however, it is possible to have more than one logical connection associated with a single physical connection or more than one physical connection associated with a single logical connection.

In an embodiment, when a client 106 connects to the server 102, a session is created that uniquely identifies the client 106. Multiple sessions may be active concurrently. A client 106 may submit graph processing tasks via the network 110 to be executed by the graph analytics engine 104.

Graph analytics engine 104, server 102, and slaves 112, 114, 116 may have access to storage device(s), which may include an allocated portion of memory in server 102, disk storage in an underlying database, or some other non-transitory storage.

Graph database 108 stores graph data about one or more graphs, each comprising multiple nodes and edges. If graph database 108 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

Client 106 broadly represents any computing device that is separate from the server 102, such as a laptop computer, desktop computer, tablet computer, smartphone, workstation, or other computer, and that is associated with a client 106 or other end user who connects with the server 102.

Network 110 may be implemented by any medium or mechanism that provides for the exchange of data between the various elements of FIG. 1. Examples of network 110 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 110 is shown as a single element but in practice, network 110 may comprise one or more local area networks, wide area networks, and/or internetworks. The various elements of FIG. 1 may also have direct (wired or wireless) communications links, depending upon a particular implementation.

For purposes of illustrating a clear example, FIG. 1 illustrates one client 106, three slaves 112, 114, 116, and single instances of certain other elements. Other embodiments may implement any number of clients or other elements. For example, the server 102 may be deployed as two or more computers, clusters, containers, and/or virtual machine instances in one or more physical or virtual machines that are co-located, separate, and/or located in shared computing facilities such as cloud computing datacenters.

Bulk Synchronous Execution

Bulk synchronous processing (BSP) is an algorithm and programming model of data-parallel computation and is may be used for processing graphs. A bulk synchronous computation proceeds in a series of global supersteps, which include three components:

Concurrent computation: every participating processor may perform local computations, i.e., each process can only make use of values stored in the local memory of the processor. The computations occur asynchronously of all the others but may overlap with communication.

Communication: The processes exchange data between themselves to facilitate remote data storage capabilities.

Barrier synchronization: When a process reaches this point (the barrier), it waits until all other processes have reached the same barrier.

In every superstep, a user defined function is executed in parallel on every item from the dataset acting as an agent. Graph analytics systems such as Pregel are vertex-centric: a single agent computation has a graph representation in BSP. It consists of graph vertex identifiers, their current values or states, as well as lists of vertexes' outgoing edges. Before any computation, all graph vertexes are partitioned and loaded into local memories of machines (hosts). They stay there throughout all computation, so that the whole processing is carried out using the local hosts' memories. Graph processing in BSP is organized by means of messages sent between machines hosting individual graph vertexes. At every superstep, each host receives from other hosts the messages related to vertexes preserved by this host and executes a user defined computation function. This function performs local processing on local vertexes and sends messages to some or all vertexes' neighbors in the graph.

Once the local computation is finished for a given vertex, processing deactivates itself and the host waits for all other vertices to finish. The barrier of synchronization mechanism allows the next superstep to begin when processing for all vertices is completed in the current superstep. Afterwards, only the vertexes that have received a message are activated. Since the graph's structure (especially edges and values assigned) does not need to be sent over the network at every superstep (iteration), BSP may be very efficient graph computation model for workloads that involve global (i.e. all vertex or all edges) computation and communication. Only specific messages necessary for the algorithm execution are exchanged between hosts.

Multi-Stage Pipelining Communication

In general, algorithm executions as well as heavy-weight table operations (i.e. join, group-by, order-by) are executed via the traditional bulk-synchronous engine to achieve maximum efficiency.

However, various workloads may include different workload characteristics that achieve no benefit from the three-stage procedure that bulk synchronous execution provides. For example, some workloads do not include inherent data dependencies that the global barriers of the bulk-synchronous engine are meant to handle. In such cases, a standard bulk synchronous execution engine will execute superfluous supersteps such as the barrier synchronization step, resulting in high latency for relatively simple tasks.

Specifically, low-latency operators such as vertex/edge property access from vertex/edge key and fixed-depth graph exploration can be implemented via multi-stage pipeline modules to achieve maximum computational efficiency for such tasks.

Figure 2:
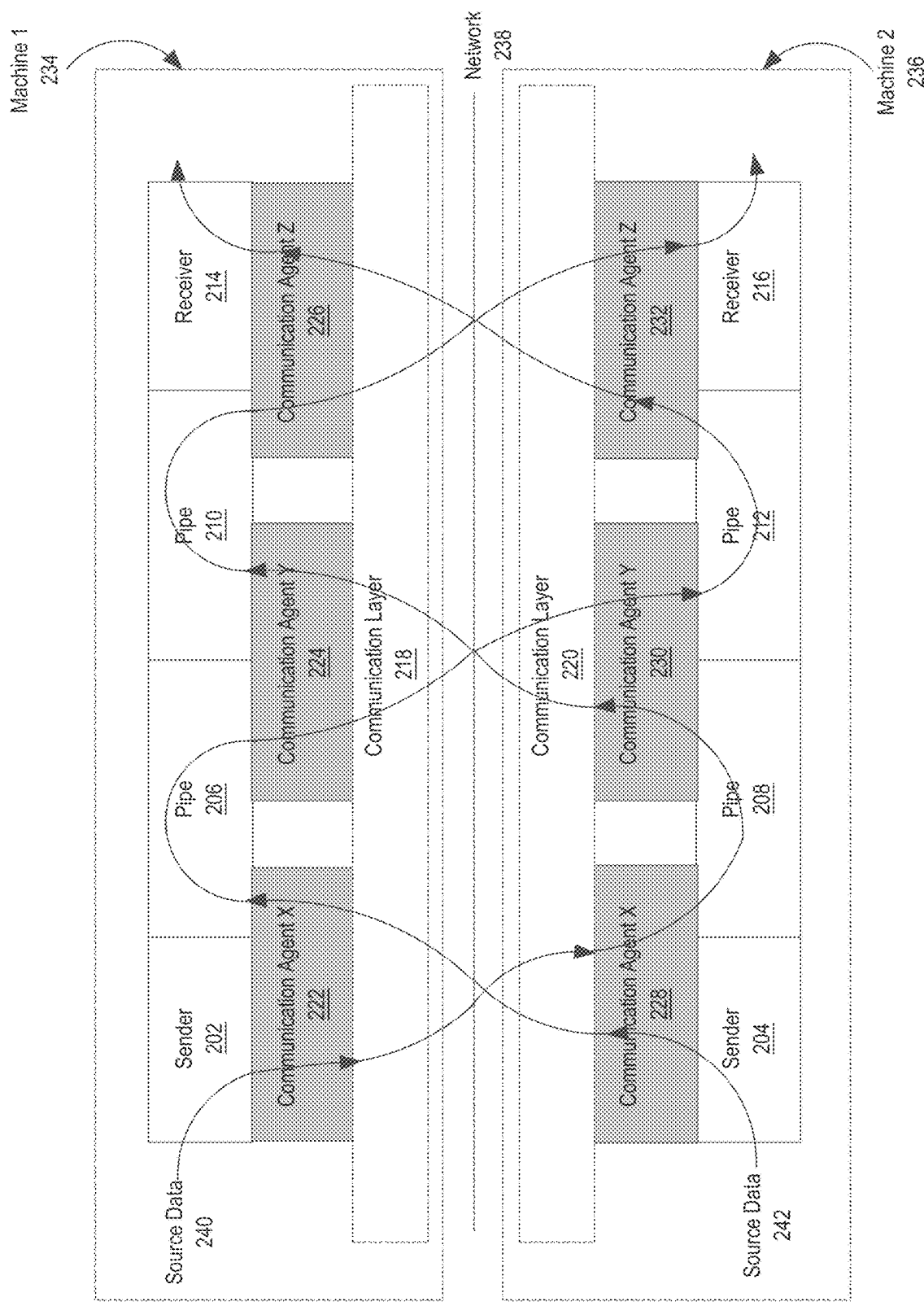
FIG. 2 illustrates the interaction of multiple user defined lambda functions in a pipelined architecture

FIG. 2 illustrates an overview of a multi-stage pipelining communication system, showing the flow of communication between two machines through a two-stage pipeline. The communication system is composed of three components: user-defined lambda functions, communication agents, and a communication layer.

In general, a lambda function is an expression definition that is not bound to an identifier or name and can also be referred to as an 'anonymous' expression. Lambda syntax provides a short and concise way of expressing a complex set of tasks to be executed.

An example programming language that utilizes lambda function constructs is Java as described by The Java Language Specification—Java SE 10 Edition. "15.27 Lambda Expressions" JSR-383 Java SE 10 (18.3)-Feb. 20, 2018, the content of which is hereby incorporated by reference. Another example programming language that utilizes lambda function constructs is Python as described by The Python Language Reference Release 3.6.5. "6.13 Lambdas" Apr. 10, 2018, the content of which is hereby incorporated by reference. Another example programming language that utilizes lambda function constructs is C++ as described by Standard for Programming Language C++. "8.1.5 Lambda expressions" Document Number: N4659-Mar. 21, 2017, the content of which is hereby incorporated by reference.

Specifically, FIG. 2 illustrates the interaction of multiple user defined lambda functions in a pipelined architecture. The pipelined architecture allows users to define multiple lambda functions to form a pipeline. A user can define three different types of lambda functions: sender 202, 204, receiver 214, 216, and pipe 206, 208, 210, 212. A sender lambda function 202, 204 is the source of the pipeline, receiver 214, 216 is the sink i.e. designed to receive incoming events from other lambda functions, and pipe 206, 208, 210, 212 connects the sender 202, 204 and receiver 214, 216 stages.

The communication layer 218, 220 abstracts the actual buffer-level communication mechanism. That is, communication layer 218, 220 delivers a buffer generated by a communication agent (stage i) 222, 224, 226, 228, 230, 232 on a machine 234, 236 to the next communication agent (stage i+1) 222, 224, 226, 228, 230, 232 on another machine 234, 236 over the network 238.

The communication agent 222, 224, 226, 228, 230, 232 is a computer system process executes a communication object. A communication object as referred to herein is an instance of a class where the object may be a combination of variables, methods, and data structures. The agent provides an application programming interface (API) to user lambda functions for generating and sending messages to remote destinations. Buffer management (message marshaling and remarshaling) is handled by this layer.

The communication agent 222, 224, 226, 228, 230, 232 also represents a marker for a stage in the pipelined execution. For example, if source data 240 is submitted by a user, communication agent X 222 is marked as stage 1 in the pipelined execution. When communication agent X 222 on machine 1 234 sends a message via network 238 to communication agent X 228 on machine 2 236, communication agent X 228 is marked as stage 2 in the pipelined execution. Because all communication agents in a cluster work synchronously, once a communication agent finished its job, all the other remote communication agent also necessarily finish their job.

Each grouping of user defined lambda functions, communication agents, and communication layer represents instructions associated with a machine or process. For example, as shown in FIG. 2, machine 1 234 encompasses user defined lambda functions including sender 202, pipe 206, pipe 210, receiver 214, communication agents 222, 224, 226, and communication layer 210. Source data 240 is submitted to the sender 202 lambda function on machine 1 234. Similarly, machine 2 242 encompasses user defined lambda functions including sender 204, pipe 208, pipe 212, receiver 216, communication agents 228, 230, 232, and communication layer 220. Source data 242 is submitted to the sender 204 lambda function on machine 2 236. Machine 1 234 and machine 2 236 may each correspond to one of the slave processes 112, 114, 116 as illustrated in FIG. 1.

Figure 3:
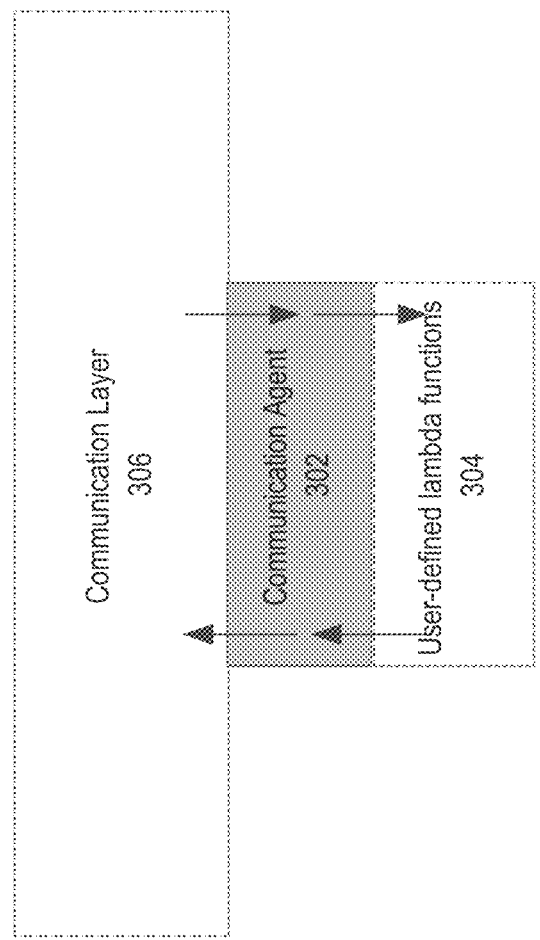
FIG. 3 illustrates a data flow handled by a data communication agent

FIG. 3 illustrates a data flow handled by a data communication agent. As discussed with respect to FIG. 2, each lambda function can be broadcasted via a communication agent 302 which is automatically created per each pipeline stage.

For the sending-side, whenever each user-defined lambda function 304 prepares a message and adds data to it, the communication agent 302 manages the underlying buffers per each destination machine or process. When a buffer is full or a pipeline stage is flushed, the buffers are broadcasted to the communication layer 306 and delivered to the destination machine via the pipeline. The communication agent 302 marks each buffer with the destination machine, the pipeline id, and the data agent (stage) id.

For the receiving-side, whenever a new buffer is received by the communication layer 306, the buffer is delivered to the communication agent 302 marked in the buffer. For each message buffer delivered, the communication agent 302 invokes the user lambda function 304 for the corresponding stage, until all the data is consumed.

The pipelined communication module works in an asynchronous manner. That is, whenever a pipeline stage (i) receives a message from pipeline stage (i−1), the associated lambda is executed immediately.

Example Procedure

FIG. 4 shows an example procedure flow 400 for a multi-stage pipelining communication mechanism for distributed graph processing. Flow 400 is one example of a flow for using a multi-stage pipelining communication mechanism for distributed graph processing. Other flows may comprise fewer or additional elements, in varying arrangements.

In an embodiment, the steps of flow 400 operate in a multi-node system comprising a plurality of nodes, each node of said plurality of nodes executing a respective communication agent object, wherein executing said respective communication agent object comprises the following steps:

In step 402, one or more sending operations are performed.

In step 404, source messages are generated based on the one or more sending operations, each source message of said source messages being marked for a particular node of a plurality of nodes.

Steps 402 and 404 collectively represent a sender lambda function 420. An example sender lambda function is depicted as part of the "salary sum" function in FIG. 5.

FIG. 5 illustrates an example API to setup a data pipeline for distributed graph processing. In the example, the following data is maintained in a distributed manner:
  map<person_key_t, int>salary; (represents the salary of a person)
  map<person_key_t, person_key_t>spouse; (represents the spouse of a person)

That is, each machine or process maintains a portion of the above data. The machine or process ID is computed using: hash_value(person_key_t) % NUM_MACHINES.

The example pseudo-code in FIG. 5 is directed to solve a problem of: given a list of people, sum up their salaries with their spouse's salaries.

```
.setSender([&](data_agent* agent) {
    for( p_key : input) {
        int dest = HASH(p_key)% NUM_MACHINES;
        agent->beginMessage(dest);
        agent->addMessageData(p_key, sizeof(person_key_t));
        agent->endMessage( );
    }
})
```

The above code snippet, as shown in FIG. 5, defines a sender lambda function 420 that is configured to invoke the communication agent object to compute a machine ID that manages the data corresponding to each person from the provided list of people, and send a message to each corresponding machine ID. The message comprises a request for data, such as the spouse of each specified person and the salary of each specified person.

Returning to flow 400 of FIG. 4, in step 406, source messages marked for said each node and sent to said each node are read.

In step 408, one or more intermediate operations are performed based on the one or more source messages.

In step 410, intermediate messages are generated based on the one or more intermediate operations, each intermediate message of said intermediate messages being marked for a particular node of said plurality of nodes.

Steps 406, 408, and 410 collectively represent an intermediate lambda function 425. An example intermediate lambda function is shown in the below code snippet from FIG. 5.

```
.addPipe([ ](data_agent* agent) {
    person_key_t p_key =
        agent->getMessageData(sizeof(person_key_t));
    int s_val = Salary[p_key];
    person_key_t sp_val = Spouse[person];
    int dest = HASH(sp_val)% NUM_MACHINES;
    agent->beginMessage(dest);
    agent->addMessageData(p_key, sizeof(person_key_t));
    agent->addMessageData(sp_key,  sizeof(person_key_t));
    agent->addMessageData(s_val,   sizeof(int));
    agent->endMessage( );
})
```

The above code snippet defines an intermediate lambda function that is configured to invoke the communication agent object to read the source messages received from the sender lambda function 420 and, based on the source message data, retrieve the salary value of the person from local machine memory. Additionally, the intermediate lambda function is configured to retrieve the spouse identifier of the person and send a message to another machine for the spouse data.

In step 412, intermediate messages marked for said each node and sent to said each node are read.

In step 414, one or more final operations are performed based on the one or more intermediate messages.

In step 416, a final result is generated based on the one or more final operations.

Steps 412, 414, and 416 collectively represent a final receiver lambda function 430. An example final receiver lambda function is shown in the below code snippet from FIG. 5.

```
.setReceiver([&](data_agent* agent) {
    person_key_t p_key =
        agent->getMessageData(sizeof(person_key_t));
    person_key_t sp_key =
        agent->getMessageData(sizeof(person_key_t));
    int s_val =
        agent->getMessageData(sizeof(int));
    int s_val2 = Salary[sp_key];
    int sum = s_val + s_val2;
    Output.add(p_key, sp_key, sum);
})
```

The above code snippet defines a final receiver lambda function that is configured to invoke the communication agent object to read the intermediate messages received from the intermediate lambda function 425 and, based on the intermediate message data, retrieve the salary value of the spouse from local machine memory, add the spouse salary value to the person salary value, and save the result to output.

In an embodiment, on each node of said plurality of nodes, executing the communication agent object comprises executing said sender lambda function, said intermediate lambda function, and said final receiver lambda function.

In a distributed graph environment, different data points may be separately managed by different machines or processes. Instead of transferring the data required for a graph computation across a network, flow 400 provides a way to pass messages between different computing nodes, performing operations using data that is locally stored or managed by the receiving machine, and passing computation results via messages to other machines to generate final results. Thus, each lambda function may be invoked on different machines.

The multi-stage pipeline shown by flow 400 provides efficient execution for low latency operators such as vertex/edge property access from vertex/edge key and fixed-depth graph exploration. By utilizing the user defined lambda functions, there is no need to do global execution and set global synchronization barriers like the bulk-synchronous engine. Additionally, no intermediate data needs to be stored between pipeline execution steps as the pipeline naturally supports concurrent execution.

For vertex/edge property access from vertex/edge key, the graph engine performs shuffling of vertices/edges at the loading time for better load-balance. Therefore, given a vertex key, a request is sent to the data dictionary location and redirected to the machine that holds the property values needed for the computation.

For fixed-depth graph exploration, the graph engine begins execution from a set of vertices (keys), whose size is smaller than T, traverses a graph up to K-level via pipeline execution, performing a computation at each level. T and K are configurable parameters, i.e. T=1% of the total number of vertices, and K=3.

Compared to bulk-synchronous execution, the multi-stage pipeline shown by flow 400 achieves significantly shorter latency since it does not require a global barrier between each pipeline step, which improves the overall execution speed of certain graph processing tasks. Thus, less clock cycles and computing resources such as volatile and non-volatile memory are required to complete the execution of certain graph processing tasks such as database searches and queries, which be performed more quickly and efficiently due to the enhanced architecture of the multi-stage pipeline.

Additionally, using the systems and methods described herein, the multi-stage pipeline does not require the storing of intermediate data between each pipeline step, which results in conserved computing resources such as processing power, storage, and memory.

The user-defined lambda functions as described herein provide flexibility to the user to optimize the pipeline for certain tasks. User-defined multiple pipe lambdas can be used to provide scalability for supporting large scale, complex graph processing tasks.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Software Overview

Figure 6:
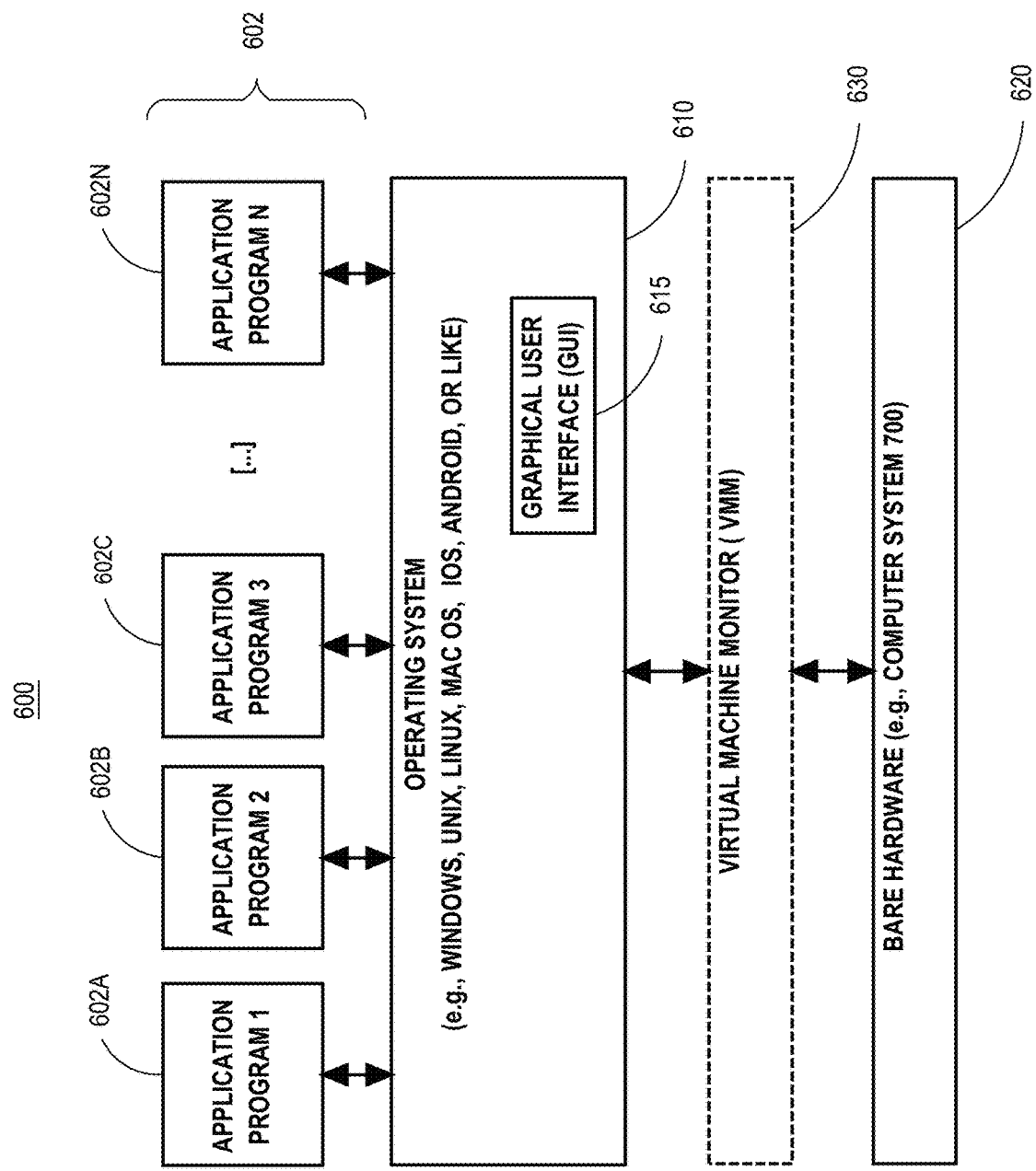
FIG. 6 is a diagram depicting a software system upon which an embodiment of the invention may be implemented.
Figure 7:
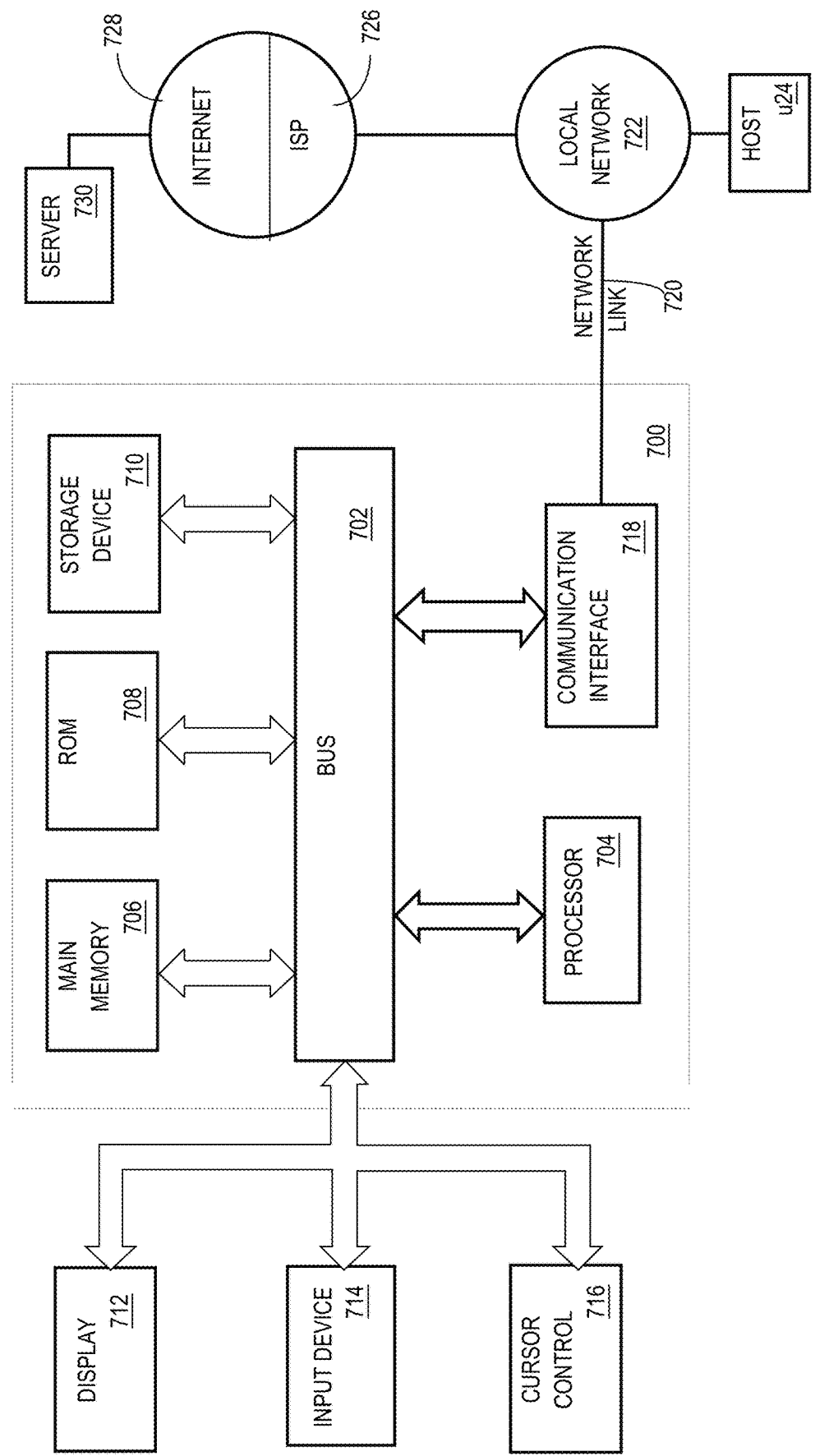
FIG. 7 is a diagram depicting a computer system that may be used in an embodiment of the present invention.

FIG. 6 is a block diagram of a basic software system 600 that may be employed for controlling the operation of computing system 700 of FIG. 7. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 402 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising,
   storing, in a multi-node system comprising a plurality of nodes, a graph comprising a plurality of vertices;
   in the multi-node system comprising the plurality of nodes, executing a fixed-depth graph exploration on the graph for a set of levels, wherein executing said fixed-depth exploration includes each node of said plurality of nodes executing a respective communication agent object, wherein said respective communication agent object includes an application programming interface (API) for receiving, generating and sending one or more messages to a remote node of said plurality of nodes, wherein said respective communication agent object comprises:

a sender lambda function configured to:
  perform one or more sending operations;
  invoke the API of the respective communication agent object to generate source messages based on the one or more sending operations, each source message of said source messages being marked for a particular node of said plurality of nodes;
an intermediate lambda function configured to:
  invoke the API of the respective communication agent object to read the source messages marked for said each node of said plurality of nodes and sent to said each node of said plurality of nodes;
  perform one or more intermediate operations based on the source messages;
  invoke the API of the respective communication agent object to generate intermediate messages based on the one or more intermediate operations, each intermediate message of said intermediate messages being marked for a particular node of said plurality of nodes;
a final receiver lambda function configured to:
  invoke the API of the respective communication agent object to read intermediate messages marked for said each node of said plurality of nodes and sent to said each node of said plurality of nodes;
  perform one or more final operations based on the intermediate messages;
  generate a final result based on the one or more final operations;
on each node of said plurality of nodes, executing the communication agent object comprises, for each level of the set of levels to traverse in the graph, executing said sender lambda function, said intermediate lambda function, and said final receiver lambda function;
on each node of said plurality of nodes, upon receiving a source message or intermediate message marked for the respective node, the respective node executing said intermediate lambda function or said final receiver lambda function without synchronizing with any other node of said plurality of nodes;
wherein the method is performed by one or more computing devices.

2. The method of claim 1, wherein executing said sender lambda function causes:
  performing the one or more sending operations,
  generating the source messages based on the one sending operations, each source message of said source messages being marked for a particular node of said plurality of nodes.

3. The method of claim 1, wherein executing said intermediate lambda function causes:
  reading the source messages marked for said each node and sent to said each node;
  performing the one or more intermediate operations based on the source messages;
  generating the intermediate messages based on the one or more intermediate operations, each intermediate message of said intermediate messages being marked for a particular node of said plurality of nodes.

4. The method of claim 1, wherein executing said final receiver lambda function causes:
  reading the intermediate messages marked for said each node and sent to said each node;
  performing the one or more final operations based on the intermediate messages;
  generating a final result based on the intermediate messages.

5. The method of claim 1, wherein executing the sender lambda function, the intermediate lambda function, and the final receiver lambda function is based on a request for a vertex or edge property access from a vertex or edge key.

6. The method of claim 1, wherein the sender lambda function, the intermediate lambda function, and the final receiver lambda function are configurable by a user.

7. The method of claim 1, wherein the sender lambda function, the intermediate lambda function, and the final receiver lambda function are each invoked on a different node of the plurality of nodes.

8. The method of claim 1, wherein each source message of said source messages is marked with a pipeline ID and a stage ID.

9. One or more non-transitory computer-readable storage medium storing instructions that, when executed by one or more processors, cause the one or more processors to perform a method comprising:
  storing, in a multi-node system comprising a plurality of nodes, a graph comprising a plurality of vertices;
  in the multi-node system comprising the plurality of nodes, executing a fixed-depth graph exploration on the graph for a set of levels, wherein executing said fixed-depth exploration includes each node of said plurality of nodes executing a respective communication agent object, wherein said respective communication agent object includes an application programming interface (API) for receiving, generating and sending one or more messages to a remote node of said plurality of nodes, wherein said respective communication agent object comprises:
    a sender lambda function configured to:
      perform one or more sending operations;
      invoke the API of the respective communication agent object to generate source messages based on the one or more sending operations, each source message of said source messages being marked for a particular node of said plurality of nodes;
    an intermediate lambda function configured to:
      invoke the API of the respective communication agent object to read the source messages marked for said each node of said plurality of nodes and sent to said each node of said plurality of nodes;
      perform one or more intermediate operations based on the source messages;
      invoke the API of the respective communication agent object to generate intermediate messages based on the one or more intermediate operations, each intermediate message of said intermediate messages being marked for a particular node of said plurality of nodes;
    a final receiver lambda function configured to:
      invoke the API of the respective communication agent object to read intermediate messages marked for said each node of said plurality of nodes and sent to said each node of said plurality of nodes;
      perform one or more final operations based on the intermediate messages;
      generate a final result based on the one or more final operations;
  on each node of said plurality of nodes, executing the communication agent object comprises, for each level of the set of levels to traverse in the graph, executing said sender lambda function, said intermediate lambda function, and said final receiver lambda function;

on each node of said plurality of nodes, upon receiving a source message or intermediate message marked for the respective node, the respective node executing said intermediate lambda function or said final receiver lambda function without synchronizing with any other node of said plurality of nodes.

10. The non-transitory computer-readable storage medium of claim 9, wherein executing said sender lambda function causes:

performing the one or more sending operations, generating the source messages based on the one sending operations, each source message of said source messages being marked for a particular node of said plurality of nodes.

11. The non-transitory computer-readable storage medium of claim 9, wherein executing said intermediate lambda function causes:

reading the source messages marked for said each node and sent to said each node;

performing the one or more intermediate operations based on the source messages;

generating the intermediate messages based on the one or more intermediate operations, each intermediate message of said intermediate messages being marked for a particular node of said plurality of nodes.

12. The non-transitory computer-readable storage medium of claim 9, wherein executing said final receiver lambda function causes:

reading the intermediate messages marked for said each node and sent to said each node;

performing the one or more final operations based on the intermediate messages;

generating a final result based on the intermediate messages.

13. The non-transitory computer-readable storage medium of claim 9, wherein executing the sender lambda function, the intermediate lambda function, and the final receiver lambda function is based on a request for a vertex or edge property access from a vertex or edge key.

14. The non-transitory computer-readable storage medium of claim 9, wherein the sender lambda function, the intermediate lambda function, and the final receiver lambda function are configurable by a user.

15. The non-transitory computer-readable storage medium of claim 9, wherein the sender lambda function, the intermediate lambda function, and the final receiver lambda function are each invoked on a different node of the plurality of nodes.

16. The non-transitory computer-readable storage medium of claim 9, wherein each source message of said source messages is marked with a pipeline ID and a stage ID.

* * * * *